(12) United States Patent
Park (10) Patent No.: US 9,671,871 B2
(45) Date of Patent: Jun. 6, 2017

(54) APPARATUS FOR RECOGNIZING GESTURE USING INFRARED RAY AND METHOD THEREOF

(71) Applicant: HYUNDAI MOBIS CO., LTD., Seoul (KR)

(72) Inventor: Chan Hee Park, Yongin (KR)

(73) Assignee: HYUNDAI MOBIS CO., LTD, Seoul (KR)

( * ) Notice: Subject to any disclaimer, the term of this patent is extended or adjusted under 35 U.S.C. 154(b) by 45 days.

(21) Appl. No.: 14/621,172

(22) Filed: Feb. 12, 2015

(65) Prior Publication Data

US 2016/0162033 A1 Jun. 9, 2016

(30) Foreign Application Priority Data

Dec. 4, 2014 (KR) .................. 10-2014-0173032

(51) Int. Cl.
*G06F 3/01* (2006.01)
*H04N 5/33* (2006.01)
*G06F 3/03* (2006.01)
*G06K 9/20* (2006.01)
*G06K 9/00* (2006.01)
*H04N 5/232* (2006.01)

(52) U.S. Cl.
CPC ......... *G06F 3/017* (2013.01); *H04N 5/23219* (2013.01); *H04N 5/33* (2013.01)

(58) Field of Classification Search
CPC .................. G06F 3/017; G06F 3/0325; G06F 2203/04808; G06K 9/209; G06K 9/00355; G06K 2209/21; H04N 5/33; H04N 5/23219
See application file for complete search history.

(56) References Cited

U.S. PATENT DOCUMENTS

| | | | | |
|---|---|---|---|---|
| 2004/0193413 | A1* | 9/2004 | Wilson ..................... | G06F 3/017 704/243 |
| 2009/0296991 | A1* | 12/2009 | Anzola .................... | G06F 3/011 382/107 |
| 2009/0315740 | A1* | 12/2009 | Hildreth .................. | G06F 3/017 341/20 |
| 2011/0141009 | A1* | 6/2011 | Izumi ...................... | A63F 13/04 345/156 |

(Continued)

FOREIGN PATENT DOCUMENTS

KR 10-2012-0025904 A 3/2012

*Primary Examiner* — Lun-Yi Lao
*Assistant Examiner* — Elliott Deaderick (57) ABSTRACT

An apparatus and a method of recognizing a gesture uses an infrared ray. The apparatus for recognizing a gesture, includes a sensing unit which detects a gesture using an infrared sensor to obtain a sensing value from the sensing result; a control unit which performs gesture recognition to which an intention of a user is reflected in accordance with a predetermined recognizing mode based on the obtained sensing value; and a storing unit which stores the predetermined recognizing mode when the gesture recognition set in advance by the user is performed. The predetermined recognizing mode includes a first recognizing mode in which the gesture is directly recognized and a second recognizing mode in which the gesture is recognized after recognizing a hold motion for determining start of the gesture recognition.

16 Claims, 6 Drawing Sheets

(56) References Cited

U.S. PATENT DOCUMENTS

| | | | | |
|---|---|---|---|---|
| 2012/0146903 A1* | 6/2012 | Arihara | ............ | G06F 3/011 |
| | | | | 345/158 |
| 2013/0050425 A1* | 2/2013 | Im | ............ | H04N 13/0207 |
| | | | | 348/46 |
| 2013/0181897 A1* | 7/2013 | Izumi | ............ | G06F 3/017 |
| | | | | 345/156 |
| 2013/0308856 A1* | 11/2013 | Carpenter | ............ | G06K 9/00335 |
| | | | | 382/164 |
| 2013/0321261 A1* | 12/2013 | Nakasu | ............ | G06F 3/0304 |
| | | | | 345/156 |
| 2014/0022158 A1* | 1/2014 | Lee | ............ | G06F 3/017 |
| | | | | 345/156 |
| 2014/0347263 A1* | 11/2014 | Dai | ............ | G06F 3/017 |
| | | | | 345/156 |

\* cited by examiner

```
if ((abs(dx) + abs(dy)) > 200)
{
    if (abs(dx) > (abs(dy) * 2))
    {
        if (dx < 0)
        {
            HOLD SWIPE RESULT = GESTURE_LEFT_SWIPE;
            prevSumOfSignalsTop = 0;
            prevSumOfSignalsBottom = 0;
            maxDiff = 0;
        }
```

```
    if ((dTop  > 0) && (dBottom < 0))
    {
       if (abs(maxDiff) < dTop - dBottom)
       {
          maxDiff = dTop - dBottom;
       }
    }
    else if ((dTop < 0) && (dBottom > 0))
    {
       if (abs(maxDiff) < dBottom - dTop)
       {
          maxDiff = dTop - dBottom;
       }
    } if ((dy < 0) && (maxDiff > 100))
       {
          GESTURE RESULT = GESTURE_UP_SWIPE;
          prevSumOfSignalsTop = 0;
          maxDiff = 0;
       }
       else if ((dy > 0) && (maxDiff < -100))
       {
          GESTURE RESULT = GESTURE_DOWN_SWIPE;
          prevSumOfSignalsTop = 0;
          prevSumOfSignalsBottom = 0;
          maxDiff = 0;
       }
```

FIG. 7

APPARATUS FOR RECOGNIZING GESTURE USING INFRARED RAY AND METHOD THEREOF

CROSS-REFERENCE TO RELATED APPLICATIONS

This application claims priority to and the benefit of Korean Patent Application No. 10-2014-0173032 filed in the Korean Intellectual Property Office on Dec. 4, 2014, the entire contents of which are incorporated herein by reference.

TECHNICAL FIELD

The present invention relates to a gesture recognizing technique and more particularly, to an apparatus for recognizing a gesture using infrared ray and a method thereof.

BACKGROUND ART

When a gesture is recognized based on a method using an infrared ray, the gesture is recognized based on an intensity of light by emitting and receiving an infrared ray, a distance, and a variation. According to the gesture recognition, a motion is directly recognized without having preparatory operation. Therefore, there is no preventive measure for an erroneous operation of an infrared diode against an intended right operation, that is, an operation to which an intention of a user is reflected.

When an erroneous operation to which a user's intention of gesture is not reflected occurs and a module in the vehicle recognizes the erroneous operation and operates based thereon, a driver's field of vision is obstructed to distract the driver, which may cause great danger.

Therefore, a module which is mounted in the vehicle requires a safe algorithm for the erroneous operation. That is, since the gesture recognizing method of the related art directly recognizes without having preparatory operation, it may have a limitation of developing a high quality gesture recognizing method.

Patent Document

Korea Unexamined Patent Application Publication No. 10-2012-0025904 (Published on Mar. 16, 2012).

SUMMARY OF THE INVENTION

The present invention has been made in an effort to provide an apparatus of recognizing a gesture using an infrared ray which recognizes a gesture of swiping up and down or left and right based on a variation on an x-axis or a y-axis, and adds a hold motion to determine start of gesture recognition, and recognizes the gesture after recognizing the added hold motion, and a method thereof.

However, an object of the present invention is not limited to the above description and other objects which have not been mentioned above will be more apparent to those skilled in the art from a reading of the following description.

An exemplary embodiment of the present invention provides an apparatus of recognizing a gesture, including: a sensing unit which detects a gesture using an infrared sensor to obtain a sensing value from the sensing result; a control unit which performs gesture recognition to which an intention of a user is reflected in accordance with a predetermined recognizing mode based on the obtained sensing value; and a storing unit which stores the recognizing mode when the gesture recognition set in advance by the user is performed, in which the recognizing mode may include a first recognizing mode in which the gesture is directly recognized and a second recognizing mode in which the gesture is recognized after recognizing a hold motion for determining start of the gesture recognition.

The control unit may recognize a hold motion when sensing values having variation which is larger than a predetermined speed in a predetermined hold region are input in accordance with the predetermined second recognizing mode and are maintained for a predetermined.

The predetermined hold region, the predetermined speed, and the predetermined time may be set or changed by the user.

The control unit may calculate a variation on an x-axis or a y-axis based on the input sensing value to determine left and right or up and down motion in accordance with the calculated variation of the x-axis or the y-axis and recognize a gesture from the determined result.

The control unit may determine that the gesture is a gesture to which the intention of the user is reflected when a speed of the variation on the x-axis and the y-axis calculated based on the input sensing value is equal to or larger than a predetermined threshold value, and determine that the gesture is a background when the speed of the calculated variation on the x-axis and the y-axis is smaller than the predetermined threshold value.

The control unit may recognize a gesture to which the intention of the user is reflected in accordance with the first recognizing mode set in advance based on the obtained sensing value.

The control unit may subtract a value corresponding to the background from the input sensing value to calculate a corrected sensing value from the subtracted result, calculate a sum of all signals based on the calculated corrected sensing value to change current state information based on the calculate sum of all signals, and recognize the gesture to which the intention of the user is reflected in accordance with the recognizing mode set in advance in consideration of the current state information.

When the sum of all signals is not zero, the control unit may change the current state information to a near state to recognize a gesture to which the intention of the user is reflected in accordance with the predetermined recognizing mode in consideration of the changed state.

When the sum of all signals is zero, the control unit may change the current state information to a far state to recognize a gesture to which the intention of the user is reflected in accordance with the predetermined recognizing mode in consideration of the changed state.

Another exemplary embodiment of the present invention provides a method of recognizing a gesture, the method including: storing a recognizing mode when gesture recognition set in advance by a user is performed, detecting a gesture using an infrared sensor to obtain a sensing value from the sensing result; and performing gesture recognition to which an intention of a user is reflected in accordance with a predetermined recognizing mode based on the obtained sensing value; In which the recognizing mode may include a first recognizing mode in which the gesture is directly recognized and a second recognizing mode in which the gesture is recognized after recognizing a hold motion for determining start of the gesture recognition.

The performing of gesture recognition may include recognizing a hold motion when sensing values having variation which is larger than a predetermined speed in a predetermined hold region are input in accordance with the predetermined second recognizing mode and are maintained for a predetermined.

The predetermined hold region, the predetermined speed, and the predetermined time may be set or changed by the user.

The performing of gesture recognition may include calculating a variation on an x-axis or a y-axis based on the input sensing value to determine left and right or up and down motion in accordance with the calculated variation of the x-axis or the y-axis and recognize a gesture from the determined result.

The performing of gesture recognition may include determining that the gesture is a gesture to which the intention of the user is reflected when a speed of the variation on the x-axis and the y-axis calculated based on the input sensing value is equal to or larger than a predetermined threshold value and determining that the gesture is a background when the speed of the calculated variation on the x-axis and the y-axis is smaller than the predetermined threshold value.

The performing of gesture recognition may include recognizing a gesture to which the intention of the user is reflected in accordance with the first recognizing mode set in advance based on the obtained sensing value.

The performing of gesture recognition may include subtracting a value corresponding to the background from the input sensing value to calculate a corrected sensing value from the subtracted result, calculating a sum of all signals based on the calculated corrected sensing value to change current state information based on the calculate sum of all signals, and recognizing the gesture to which the intention of the user is reflected in accordance with the recognizing mode set in advance in consideration of the current state information.

When the sum of all signals is not zero, performing of gesture recognition may include changing the current state information to a near state to recognize a gesture to which the intention of the user is reflected in accordance with the predetermined recognizing mode in consideration of the changed state.

When the sum of all signals is zero, performing of gesture recognition may include changing the current state information to a far state to recognize a gesture to which the intention of the user is reflected in accordance with the predetermined recognizing mode in consideration of the changed state.

By doing this, according to the exemplary embodiment of the present invention, a gesture of swiping up and down or left and right is recognized based on a variation on an x-axis and a y-axis and a hold motion to determine start of the gesture recognition is added to recognize the gesture after recognizing the added hold motion, thereby preventing an erroneous operation of the gesture recognition.

Further, according to the exemplary embodiment of the present invention, the hold motion is added to prevent the erroneous operation of gesture recognition from occurring, thereby improving convenience of a user.

DETAILED DESCRIPTION OF THE INVENTION

Hereinafter, an apparatus of recognizing a gesture using an infrared ray and a method thereof according to an exemplary embodiment of the present invention will be described with reference to accompanying drawings. Parts which are required to understand an operation and an effect of the present invention will be mainly described in detail.

In the description of components of an exemplary embodiment, a component having the same name may be denoted by a different reference numeral in some drawings but may be denoted by the same reference numeral even in different drawings. However, even in this case, it does not mean that the component has different functions depending on the exemplary embodiment or the components have the same function in the different exemplary embodiments but the function of each of the components may be determined based on the description of the components in the corresponding exemplary embodiment.

Specifically, the present invention suggests a new method of recognizing a gesture of swiping left and right or up and down based on a variation on an x-axis or a y-axis but adding a hold motion for determining start of gesture recognition to recognize a gesture after recognizing the added hold motion.

Figure 1:
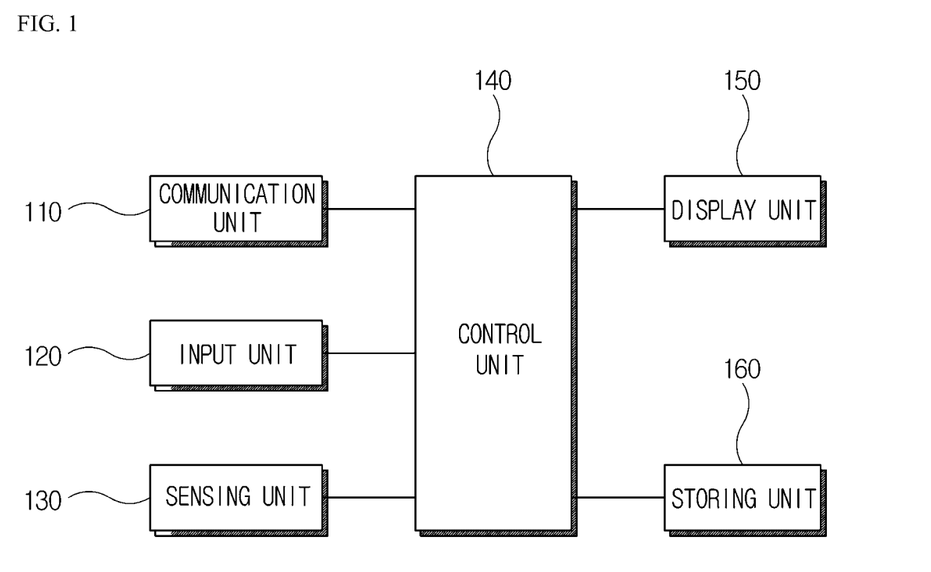
FIG. 1 is a view illustrating an apparatus of recognizing a gesture according to an exemplary embodiment of the present invention.

FIG. 1 is a view illustrating an apparatus of recognizing a gesture according to an exemplary embodiment of the present invention.

As illustrated in FIG. 1, an apparatus of recognizing a gesture according to an exemplary embodiment of the present invention may include a communication unit 110, an input unit 120, a sensing unit 130, a control unit 140, a display unit 150, and a storing unit 160.

The communication unit 110 interworks with an electronic apparatus provided in a vehicle to transmit and receive various information.

The input unit 120 may receive information according to a menu item or a key operation of the user. For example, the input unit 120 may set various parameters for gesture recognition in accordance with a menu operation of the user or receive information for setting a recognizing mode.

The sensing unit 130 emits an infrared ray and receives the infrared ray which is reflected from an object and returns. The sensing unit 130 may include a plurality of light emitting sensors and a plurality of light receiving sensors.

The control unit 140 may recognize a gesture to which an intention of the user is reflected based on a sensing value detected by the sensing unit 130. For example, when a variation of detected sensing values is large, the control unit 140 recognizes the motion as a gesture to which an intention of the user is reflected and when a variation of detected sensing values is small, recognizes the motion as a background to which the intention of the user is not reflected.

In this case, the control unit 140 may recognize the gesture in accordance with a predetermined recognizing mode. Here, the recognizing mode may include a first recognizing mode in which the gesture is directly recognized and a second recognizing mode in which the gesture is recognized after recognizing a hold motion for determining start of the gesture recognition.

For example, when a sensing value having a variation which is larger than a predetermined speed in a predetermined hold region is input in accordance with the second recognizing mode and then maintained for a predetermined time, the control unit 140 recognizes the gesture after recognizing the hold motion for determining start of gesture recognition.

Such a recognizing mode may be set or changed in accordance with a purpose or a demand of the user. In other words, the first recognizing mode and the second recognizing mode may be selectively performed by setting or changing of the user.

The display unit 150 may display various functions which are performed using the gesture recognition.

The storing unit 160 may store various information related with the gesture recognition and the recognizing modes.

Figure 2:
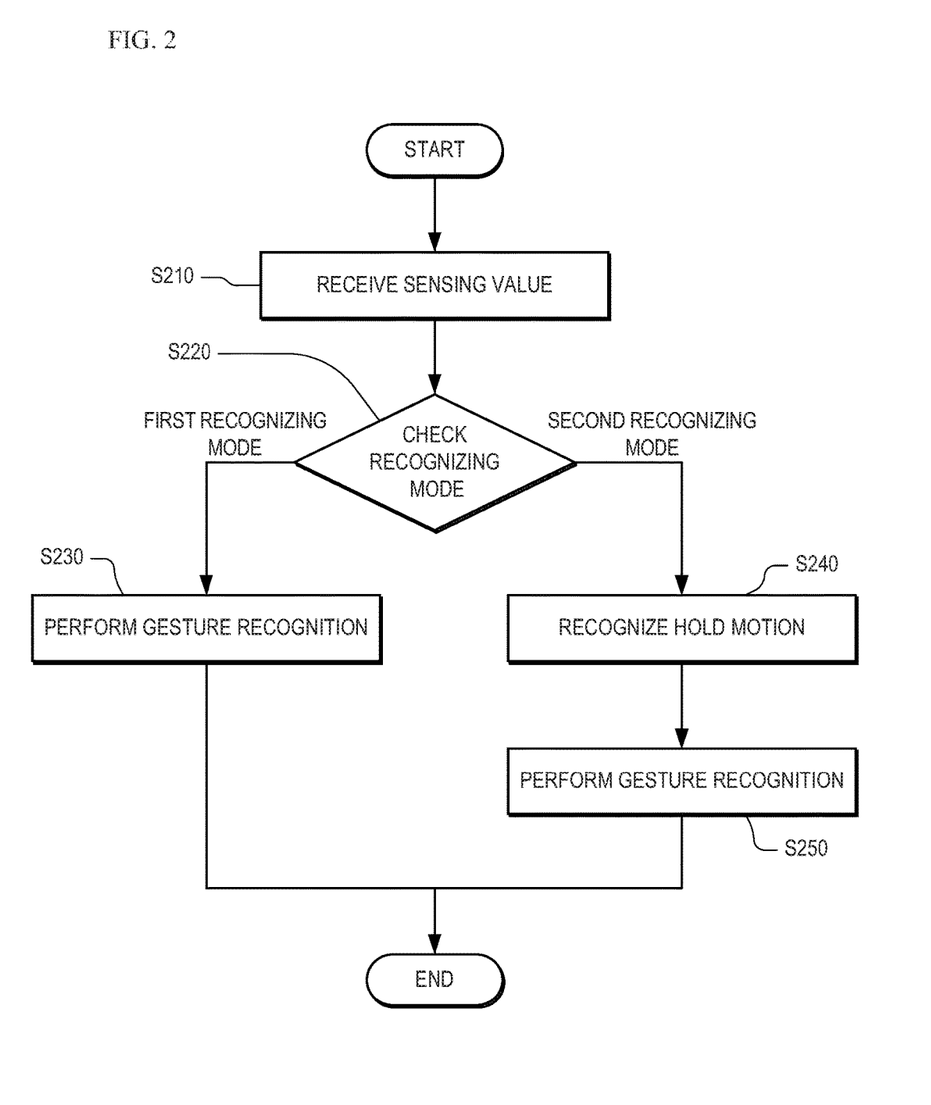
FIG. 2 is a view illustrating a method of recognizing a gesture according to an exemplary embodiment of the present invention.

FIG. 2 is a view illustrating a method of recognizing a gesture according to an exemplary embodiment of the present invention.

As illustrated in FIG. 2, the apparatus of recognizing a gesture according to an exemplary embodiment of the present invention (hereinafter, referred to as a gesture recognizing apparatus) may receive a sensing value detected by a sensor (S210).

Next, when the gesture recognizing apparatus receives the sensing value, the gesture recognizing apparatus may check the predetermined recognizing mode (S220). That is, the gesture recognizing apparatus may check whether the recognizing mode is a first recognizing mode in which the gesture is directly recognized or a second recognizing mode in which the gesture is recognized after recognizing a hold motion for determining start of the gesture recognition.

Next, when the first recognizing mode is set from a checking result, the gesture recognizing apparatus may recognize a gesture to which an intention of the user is reflected based on the input sensing value (S230).

In contrast, when the second recognizing mode is set from the checking result, the gesture recognizing apparatus may recognize a hold motion for determining start of gesture recognition based on the input sensing value (S240).

In this case, when a sensing value which has a variation larger than a predetermined speed is input in the predetermined hold region and maintained for a predetermined time, the gesture recognizing apparatus recognizes the hold motion.

Figure 3:
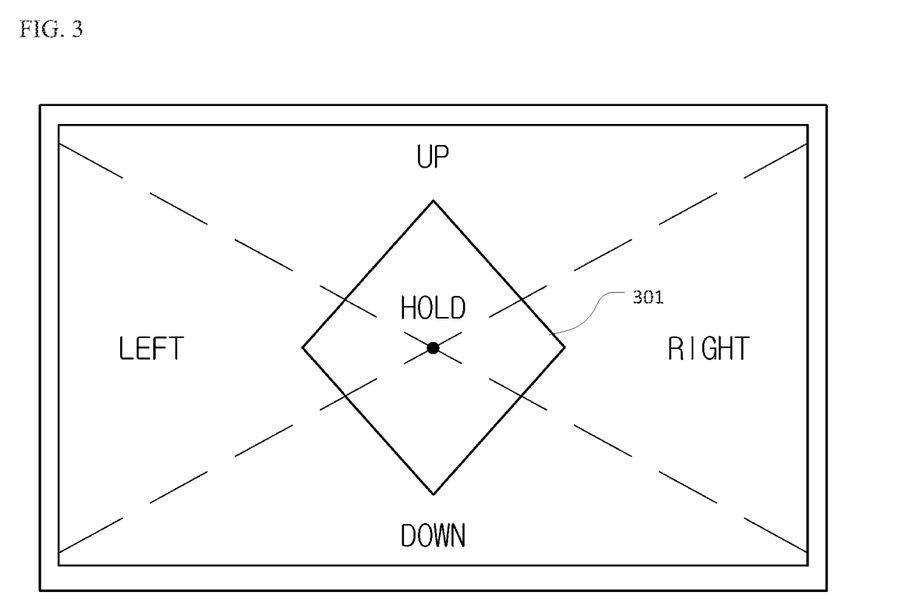
FIG. 3 is a view illustrating a region for recognizing a hold motion according to an exemplary embodiment of the present invention.

FIG. 3 is a view illustrating a region for recognizing a hold motion according to an exemplary embodiment of the present invention.

Referring to FIG. 3, it is shown that a rhombic hold region 301 where a hold motion is recognized has been set in advance at the center of a display. A width of the display is longer than a length.

All the previously set hold region and the predetermined time are tuning variables and set by the user.

That is, when the sensing value is input in the hold region set in advance by the user through coordinate tracking, among the entire region of the display, and is maintained for a predetermined time, the gesture recognizing apparatus may recognize the hold motion.

Next, when the gesture recognizing apparatus recognizes the hold motion, the gesture recognizing apparatus may recognize the gesture to which the intention of the user is reflected based on the sensing value which is input after the hold motion (S250).

In this case, the gesture recognizing apparatus calculates a variation on the x-axis or the y-axis based on the input sensing value to determine left and right or up and down motion in accordance with the calculated variation.

Figure 4:
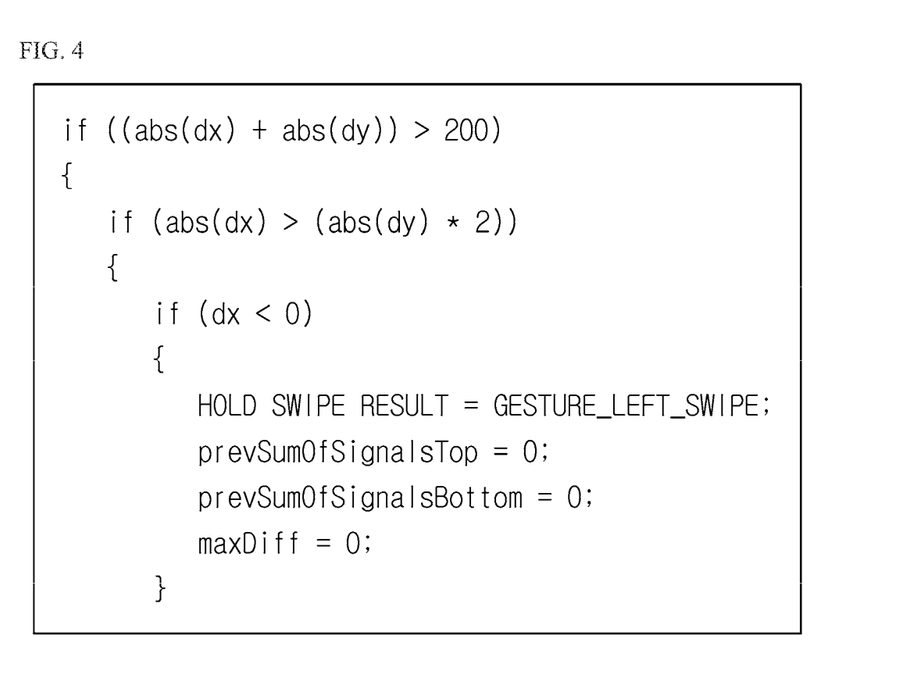
FIG. 4 is a first view for explaining a principle of determining a motion according to an exemplary embodiment of the present invention.

FIG. 4 is a first view for explaining a principle of determining a motion according to an exemplary embodiment of the present invention.

As illustrated in FIG. 4, when a current coordinate is out of the preset hold region from a coordinate where the hold motion occurs, the motion to the x-axis direction or the y-axis direction is determined. A source code for determining the motion will be described as an example.

For example, if ldx/dyl is 2 or larger, it is determined that the motion is a motion to the x-axis direction, or if ldx/dyl is smaller than 2, it is determined that the motion is a motion to the y-axis direction. In this case, from signs of dx which is a variation of the x-axis and dy which is a variation of the y-axis, left/right or up/down is determined.

Figure 5:
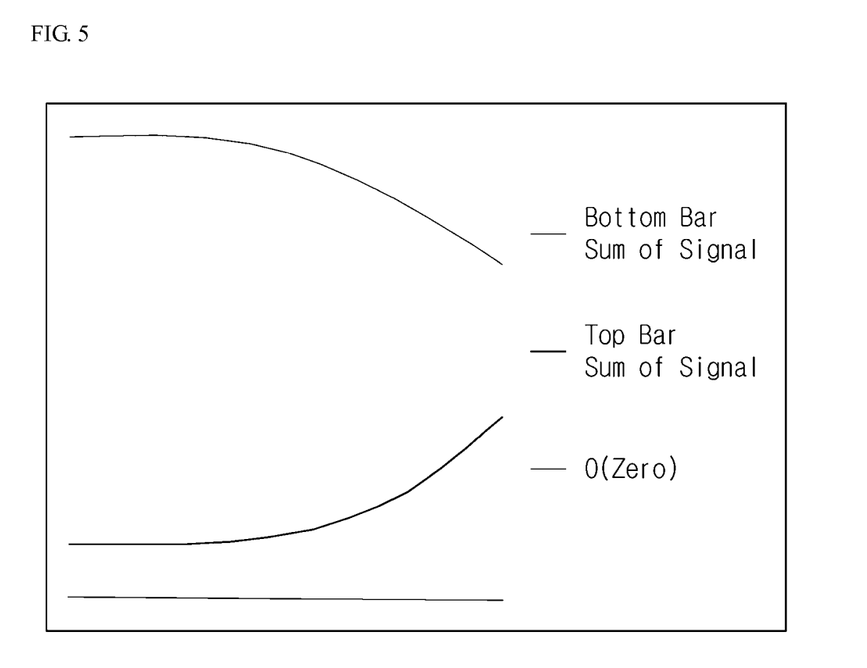
FIG. 5 is a second view for explaining a principle of determining a motion according to an exemplary embodiment of the present invention.

FIG. 5 is a second view for explaining a principle of determining a motion according to an exemplary embodiment of the present invention.

As illustrated in FIG. 5, there is an axis which is easily recognized with respect to the x-axis and the y-axis or there is an axis which is hard to be recognized. For example, in an LCD screen in which a width is larger than a length, even when a human hand is at the center of the screen, sensors at the lower portion may recognize values of reflected amounts of a wrist. Therefore, even though the hand moves to the bottom, the motion to the bottom may be not correctly recognized due to the infrared value by the wrist.

Further, the hand of the user disappears in accordance with the motion with respect to a gesture at an axis where a recognizing range is small as illustrated in the drawing, and background values of the rear side are instantly input to cause erroneous recognition.

Figure 6:
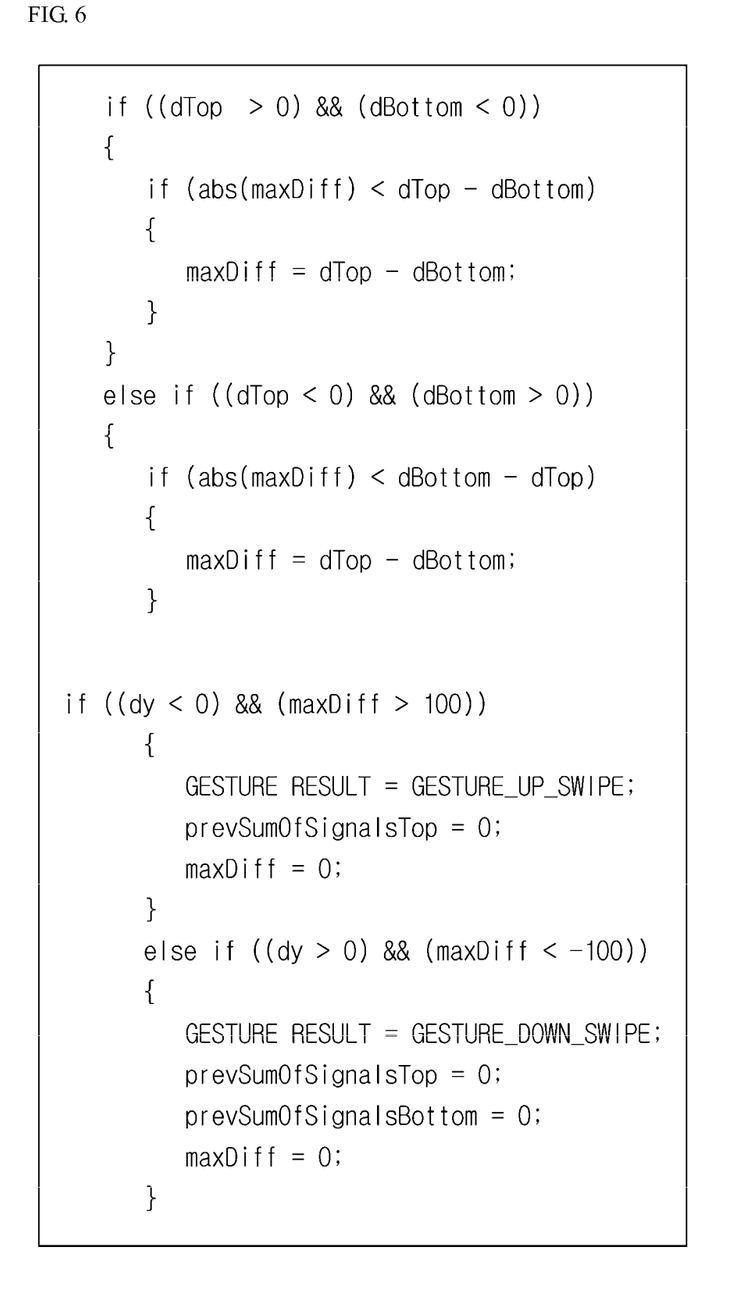
FIG. 6 is a third view for explaining a principle of determining a motion according to an exemplary embodiment of the present invention.

FIG. 6 is a third view for explaining a principle of determining a motion according to an exemplary embodiment of the present invention.

As illustrated in FIG. 6, when the hand moves to the top, as illustrated in FIG. 5, a signal of the top needs to be increased and a signal of the bottom needs to be decreased. By using this, only when a condition of determining up and down motion is compared with a changing progress of a sum of the top/bottom signals and the sum shows an opposite tendency and the moving direction matches an top/bottom signal determined from the coordinate, it is determined that the motion is a up/down motion. By doing this, the erroneous operation is reduced. A source code for determining the motion will be described as an example.

For example, a relative ratio of a sum of the top and bottom signal amounts is stored into a variable maxDIFF and the up/down motion is determined from a relative changing progress and a changed sign of dy.

Figure 7:
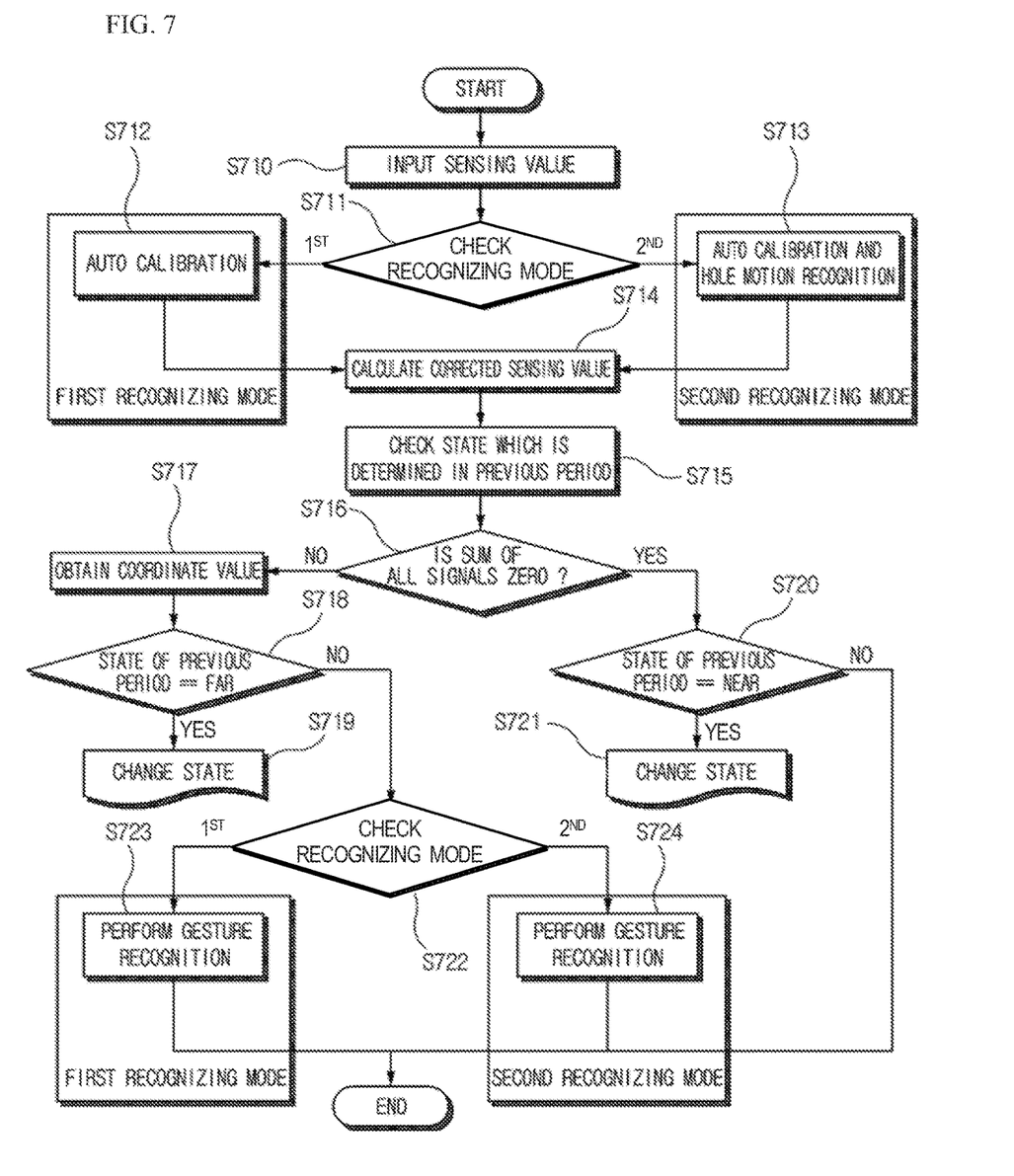
FIG. 7 is a view illustrating a process of inputting a sensing value according to an exemplary embodiment of the present invention in detail.

FIG. 7 is a view illustrating a process of inputting a sensing value according to an exemplary embodiment of the present invention in detail.

As illustrated in FIG. 7, the apparatus of recognizing a gesture according to an exemplary embodiment of the present invention (hereinafter, referred to as a gesture recognizing apparatus) may receive a sensing value Add_Signal detected by a sensing unit (S710). Here, Add_Signal indicates a sum of signals which are input to a light receiving sensor.

Next, when the gesture recognizing apparatus receives the sensing value, the gesture recognizing apparatus may check the previously set recognizing mode (S711).

Next, when the mode is a first recognizing mode from the checked result, the gesture recognizing apparatus may determine whether the value is a value by the background or a value by a gesture to which the intention of the user is reflected through auto calibration based on the input sensing value (S712).

In this case, when the speed of the variation is equal to or larger than a predetermined threshold value based on the sensing value, the gesture recognizing apparatus determines that the gesture is a gesture to which the intention of the user is reflected and in contrast, when the speed of the variation is smaller than the predetermined threshold value, determines that the motion indicates the background.

Next, the gesture recognizing apparatus may calculate a corrected sensing value Effective_signal from the input sensing value (S714). That is, the gesture recognizing apparatus subtracts a value corresponding to the background from the input sensing value and calculates the corrected sensing value from the subtracted result.

Next, when the gesture recognizing apparatus calculates the corrected sensing value, the gesture recognizing apparatus may check a state determined in a previous period, that is, a touch or hovering state (S715).

Next, the gesture recognizing apparatus calculates a sum of all signals based on the calculated corrected sensing value and checks whether the calculated sum of all signals is zero (S716).

Next, when the sum of all signals is not zero, the gesture recognizing apparatus obtains a coordinate value through the coordinate tracking (S717) and checks whether the state of the previous period is a far state (S718).

Next, when the state of the previous period is a far state from the checked result, the gesture recognizing apparatus changes state information to a near state (S719) and then recognizes the gesture. When the state of the previous period is not the far state, the gesture recognizing apparatus recognizes the gesture (S722, S723).

In this case, when the sum of all signals is not zero, it is determined that a variation of the sensing value occurs. Accordingly, together with the coordinate tracking, the current state information is changed to the near state.

In contrast, when the sum of all signals is zero, the gesture recognizing apparatus checks whether the previous state is the near state (S720). When the previous state is the near state from the checked result, the gesture recognizing apparatus changes the state information to the far state (S721) and then recognizes the gesture in consideration of the changed state information (S722, S724). In contrast, when the previous state is not the near state, all the subsequent gesture recognizing processes may be completed.

Even though all components of the exemplary embodiment may be combined as one component or operates to be combined, the present invention is not limited to the exemplary embodiment. In other words, all components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The storage media of the computer program may include a magnetic recording medium, an optical recording medium, or a carrier wave medium.

The exemplary embodiments of the present invention which have been described above are examples and it is obvious to those skilled in the art that various changes or modifications may be made without departing from the spirit and scope of the present invention. Accordingly, the exemplary embodiments disclosed herein are not intended to limit but describe the technical spirit of the present invention and the scope of the technical spirit of the present invention is not restricted by the exemplary embodiments. The protection scope of the present invention should be interpreted based on the following appended claims and it should be appreciated that all technical spirits included within a range equivalent thereto are included in the protection scope of the present invention.

What is claimed is:

1. An apparatus for recognizing a gesture, comprising:
    a sensing unit which detects first and second sensing values using an infrared sensor;
    a control unit which recognizes a hold motion based on the first sensing value, and performs gesture recognition in accordance with a predetermined recognizing mode based on the second sensing value, the control unit recognizing the hold motion when the first sensing value is in a predetermined hold region, the hold region being smaller than a total sensing region of the sensing unit, the hold region being set in advance at the center of a display; and
    a storing unit which stores the predetermined recognizing mode when the gesture recognition is performed,
    wherein when the predetermined recognizing mode is a first recognizing mode, the control unit begins the gesture recognition automatically,
    wherein when the predetermined recognizing mode is a second recognizing mode, the control unit begins the gesture recognition after the hold motion is recognized,
    wherein the control unit calculates a first variation of the second sensing value on an x-axis and a second variation of the second sensing value on a y-axis, determines one of a left, right, up, and down motion based on the first and second variations, and recognizes a gesture from the determined motion, and
    wherein the control unit determines the up or down motion only when a sum of top signals and a sum of bottom signals shows an opposite tendency.

2. The apparatus of claim 1,
    wherein the control unit recognizes the hold motion when the first sensing value has a variation that is larger than a predetermined speed in the predetermined hold region, and is maintained for a predetermined time.

3. The apparatus of claim 2, wherein the predetermined hold region, the predetermined speed, and the predetermined time are set or changed by the user.

4. The apparatus of claim 1, wherein when a speed of the first variation or a speed of the second variation is equal to or larger than a predetermined threshold value, the control unit determines that the second sensing value corresponds to the gesture to which the intention of the user is reflected, and when the speed of the first variation or the second variation is smaller than the predetermined threshold value, the control unit determines that the second sensing value corresponds to a background motion.

5. The apparatus of claim 1, wherein the predetermined recognizing mode is the first recognizing mode, and
wherein the control unit recognizes the second sensing value as a gesture to which the intention of the user is reflected in accordance with the first recognizing mode.

6. The apparatus of claim 1, wherein the control unit:
calculates a corrected sensing value by subtracting a value corresponding to a background motion from the second sensing value,
calculates a sum of a plurality of signals based on the corrected sensing value,
changes current state information based on the calculated sum of the plurality of signals, and
recognizes the gesture to which the intention of the user is reflected in accordance with the predetermined recognizing mode and in consideration of the current state information.

7. The apparatus of claim 6, wherein when the sum of the plurality of signals is not zero, the control unit changes the current state information to a near state and recognizes the second sensing value as a gesture to which the intention of the user is reflected in accordance with the predetermined recognizing mode and in consideration of the near state.

8. The apparatus of claim 6, wherein when the sum of the plurality of signals is zero, the control unit changes the current state information to a far state and recognizes the second sensing value as a gesture to which the intention of the user is reflected in accordance with the predetermined recognizing mode and in consideration of the far state.

9. A method of recognizing a gesture, the method comprising:
storing a predetermined recognizing mode;
detecting a gesture by obtaining first and second sensing values in a total sensing region using an infrared sensor;
recognizing a hold motion when the first sensing value is in a predetermined hold region, the hold region being smaller than the total sensing region, the hold region being set in advance at the center of a display; and
performing gesture recognition to which an intention of a user is reflected in accordance with the predetermined recognizing mode based on the second sensing value;
wherein when the predetermined recognizing mode is a first recognizing mode, the gesture recognition begins automatically,
wherein when the predetermined recognizing mode is a second recognizing mode, the gesture recognition begins after the hold motion is recognized,
wherein performing gesture recognition includes calculating, based on the second sensing value, a first variation on an x-axis and a second variation on a y-axis, determining one of a left, right, up, and down motion based on the first and second variations, and recognizing a gesture from the determined motion, and
wherein determining the up or down motion is performed only when a sum of top signals and a sum of bottom signals show an opposite tendency.

10. The method of claim 9,
wherein the hold motion is recognized when the first sensing value has a variation that is larger than a predetermined speed in the predetermined hold region, and is maintained for a predetermined time.

11. The method of claim 10, wherein the predetermined hold region, the predetermined speed, and the predetermined time are set or changed by the user.

12. The method of claim 9, wherein performing gesture recognition includes:
determining that the second sensing value corresponds to a gesture to which the intention of the user is reflected when a speed of the first variation or a speed of the second variation is equal to or larger than a predetermined threshold value; and
determining that the sensing value corresponds to a background motion when the speed of the first variation and the speed of the second variation are both smaller than the predetermined threshold value.

13. The method of claim 9,
wherein the predetermined recognizing mode is set to the first recognizing mode, and
wherein performing gesture recognition includes recognizing the gesture in accordance with the first recognizing mode.

14. The method of claim 9, wherein performing gesture recognition includes:
subtracting a value corresponding to a background motion from the second sensing value and calculates a corrected sensing value from the subtracted result;
calculating a sum of a plurality of signals based on the calculated corrected sensing value;
changing current state information based on the calculated sum of the plurality of signals; and
recognizing the gesture to which the intention of the user is reflected in accordance with the predetermined recognizing mode set in advance in consideration of the current state information.

15. The method of claim 14, wherein when the sum of the plurality of signals is not zero, performing gesture recognition includes changing the current state information to a near state and recognizing the gesture to which the intention of the user is reflected in accordance with the predetermined recognizing mode in consideration of the near state.

16. The method of claim 14, wherein when the sum of the plurality of signals is zero, performing gesture recognition includes changing the current state information to a far state and recognizing the gesture to which the intention of the user is reflected in accordance with the predetermined recognizing mode in consideration of the far state.

* * * * *